Patented Oct. 29, 1940

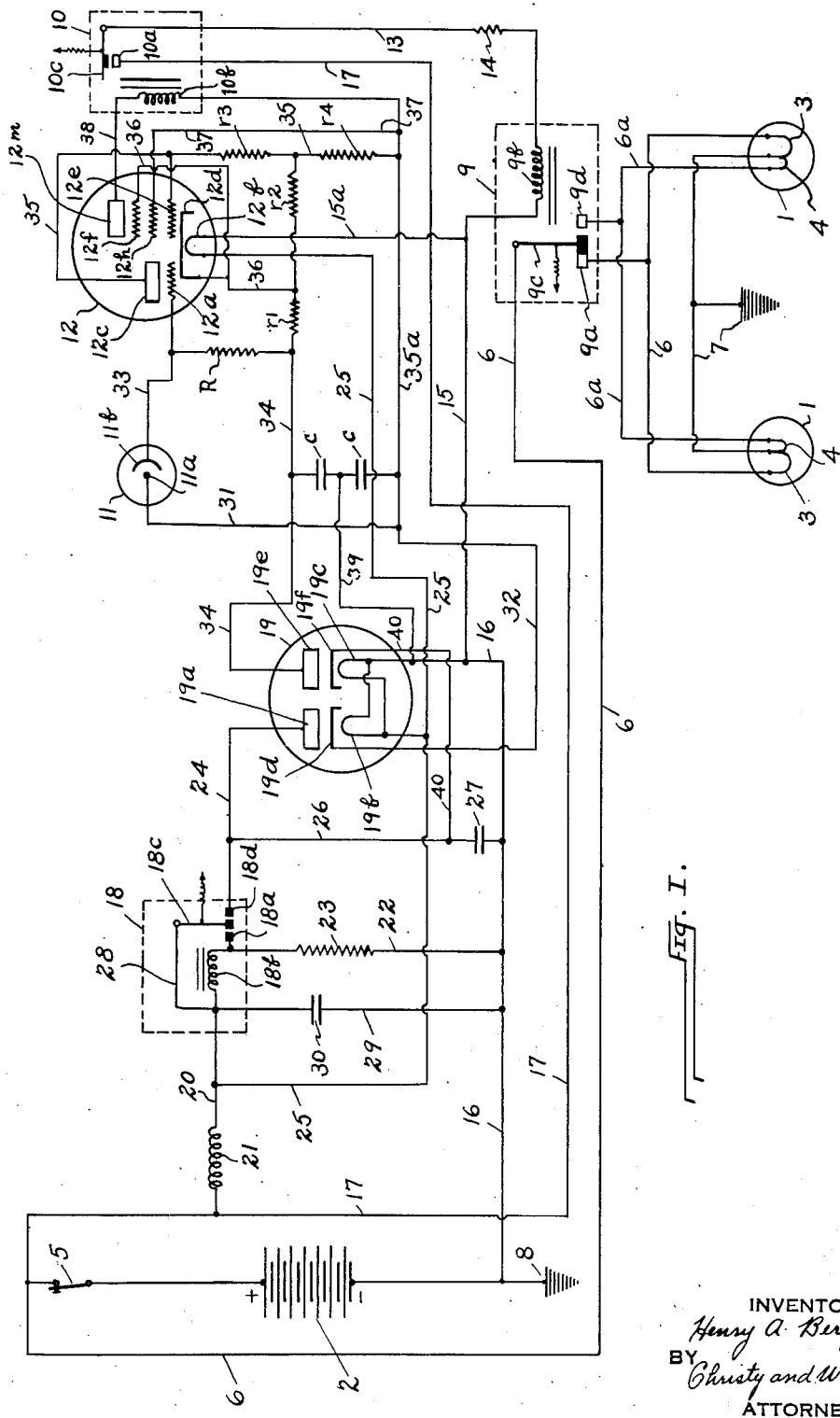
Oct. 29, 1940.  H. A. BERG, JR  2,219,976
AUTOMOBILE HEADLIGHT CONTROL
Filed Feb. 26, 1937    2 Sheets-Sheet 1
Fig. I.
INVENTOR
Henry A. Berg, Jr.
BY Christy and Wharton
ATTORNEYS

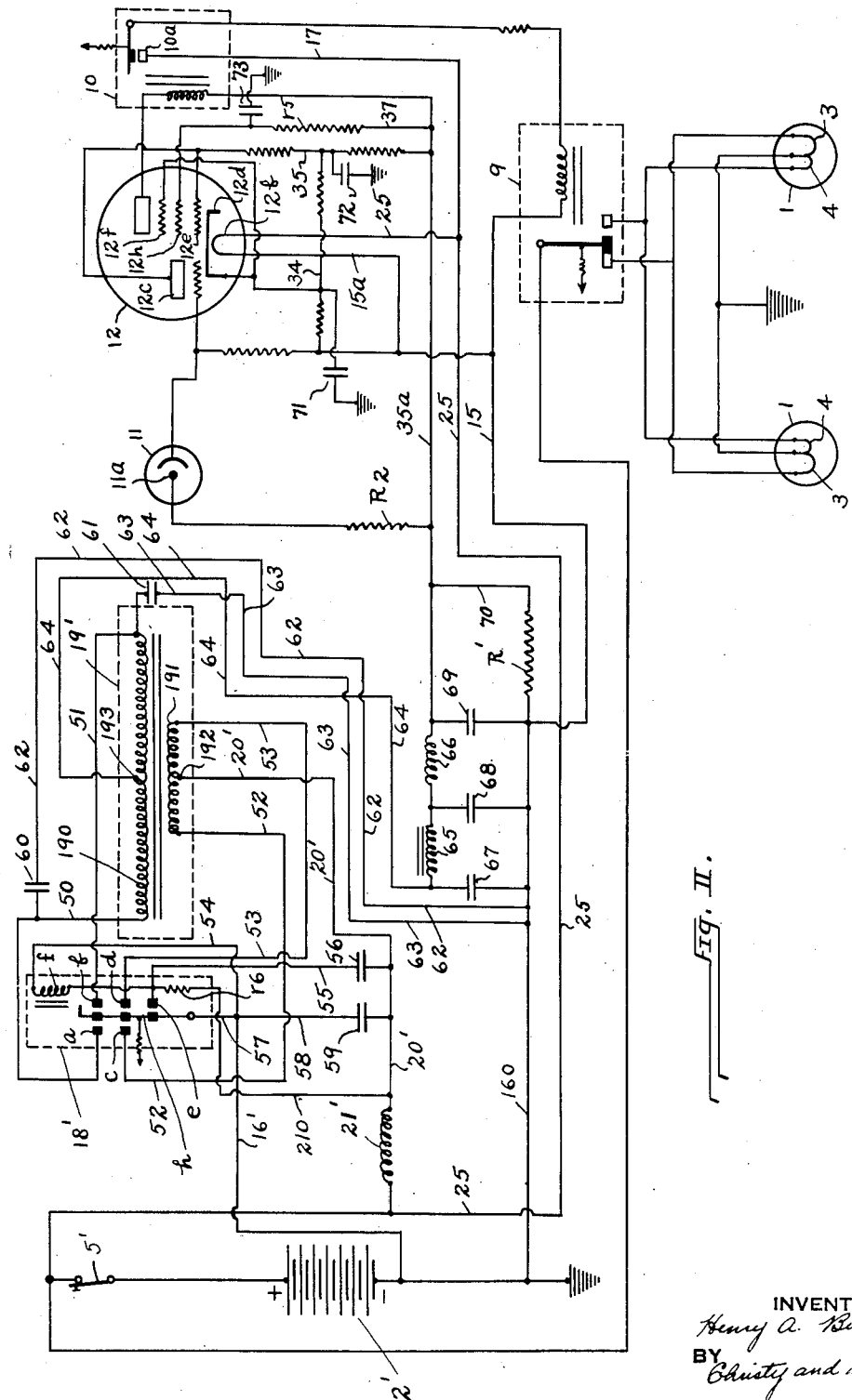

2,219,976

UNITED STATES PATENT OFFICE 2,219,976

AUTOMOBILE HEADLIGHT CONTROL

Henry A. Berg, Jr., Pittsburgh, Pa., assignor of one-third to Luther L. Guthrie, Butler, Pa., and one-third to Chester A. Roeder, St. Louis, Mo.

Application February 26, 1937, Serial No. 127,867

12 Claims. (Cl. 171—97)

My invention relates to automobiles, and consists in means for automatically deflecting or dimming the light-beams projected by the headlights of such vehicles.

Some years ago it was proposed to employ a selium cell, a so-called photo-electric cell, for controlling the automatic dimming of headlights. More specifically, it was proposed to install a photo-electric cell in such position on a car that the light beams of cars approaching in opposite direction would impinge and play upon the cell. Such change in illumination of the cell was in known way adapted to produce or modify an electric current, and in known way such electric current was adapted to operate an electric relay. And such operation of the relay was employed to effect the automatic deflecting or dimming of the headlight beams of the car.

So far as I am aware, all of the various apparatus proposed hitherto proved impractical. They were too delicate, either electrically or structurally; in many cases they embodied devices which were too costly to manufacture; and in most cases, if not all, the proposed apparatus were incapable of developing sufficiently positive operation from energy supplied by the storage battery of an automobile. There probably are other reasons for the failures, but whatever they are the fact remains that no one has developed apparatus which has "filled the bill."

More particularly, my invention consists in apparatus embodying a novel organization of electrical devices, by virtue of which the automatic dimming, or deflecting, of the headlight beams of an automobile becomes practical, both economically and technically.

In the accompanying drawings Fig. I is a diagrammatic view of an electrical organization embodying the invention; and Fig. II is a diagrammatic view of the organization, illustrating certain modifications.

Referring to Fig. I, the reference numerals 1, 1 indicate the electric lamps of the two headlights (not shown) of an automobile, and 2 the usual electric storage battery. The lamps are shown to be of the conventional dual filament type; that is, each lamp includes two filaments 3 and 4. Filament 3, when energized, generates light of relatively high intensity, and filament 4 generates light of lower intensity. When the filaments 3 are energized, the headlights of the car project beams of high intensity and relatively great reach on the roadway in advance of the car, and, when the filaments 4 are energized, the beams are of lower intensity, and are projected or deflected downward upon the roadway in front of the car. Normally, when driving at night, the filaments 3 are energized, and the intensity and glare of the light beams tend to blind the drivers of cars approaching in opposite direction, wherefore courtesy, if not legal regulation, demands that the light beams be temporarily deflected or dimmed. As intimated above, the deflecting or dimming of the beams may be accomplished by de-energizing filaments 3 and energizing filaments 4. The invention consists in automatic means to this end.

The normal energizing circuit of the filaments 3 runs from the positive side of battery 2, through switch 5 (usually located on the dashboard of the car), and wire 6 to the positive terminals of such filaments, and the negative terminals of the filaments are grounded (in common with the negative terminals of filaments 4) in the metal body of the car, as indicated at 7, while the negative terminal of the battery 2 is grounded to the car body, as indicated at 8. In accordance with the invention, I provide a plurality of relays—in this case two relays 9 and 10—that operate in conjunction with a photo-electric cell 11 and an amplifying tube 12 for automatically opening the energizing circuit of filaments 3 and closing an energizing circuit through filaments 4.

As mentioned above, the photo-electric cell 11 will be mounted upon the radiator or other convenient part of the automobile, where it will be subject to the headlight beams of approaching cars, and the rest of the apparatus may be conveniently housed behind the dashboard or under the hood of the car. The relay 10 is delicately sensitive to minute electric currents, whereas relay 9—a much stronger relay—operates on stronger current.

The armature 9c of relay 9 is included in series in line 6; normally the armature stands in the position illustrated, closing through a contact 9a the circuit to the positive terminals of filaments 3. The armature 10c of relay 10 is connected through a wire 13, a protective resistor 14, the actuating coil 9b of relay 9, and wires 15 and 16, to the negative terminal of battery 2, and such armature 10c normally stands in open position with respect to relay contact 10a which is by a wire 17 connected (through switch 5) with the positive terminal of said battery. As will presently appear in greater detail, the actuating coil 10b of relay 10 is so organized in circuit with the amplifying tube 12 that the relay armature 10c is attracted into closed position when a headlight beam impinges upon the photo-electric cell 11.

Such closing of armature 10c with contact 10a closes circuit 13, 14, 9b, 15, 16, 2, 17; the actuating coil 9b of relay 9 is energized; thereupon the armature 9c swings from contact 9a into engagement with a contact 9d; the energizing circuit of filaments 3 is interrupted, and substantially simultaneously therewith a circuit through contact 9d, leads 6a, and lamp filaments 4 is closed. Thus, when the light beams of an approaching car impinge upon the photo-electric cell 11, the light beams of lamps 1, 1 are dimmed or deflected, and remain so, so long as the cell 11 is illuminated by the beams of the approaching car. As the approaching car reaches and passes the car equipped with my apparatus, the illumination of the cell 11 is abruptly terminated; the armature of relay 10 returns to open position; the actuating coil 9b of relay 9 is deenergized; and the relay armature 9c returns to its illustrated position, whereby the energizing circuit through filaments 4 is automatically interrupted and immediately closed through filaments 3. In such manner the headlights of a car may be automatically dimmed or deflected.

The use of a plurality of relays, or other electric make-and-break devices, operating on currents of unequal intensity, is important to successful operation of automatic headlight-controlling apparatus. Additionally, it is practically essential to convert the constant D. C. current of the battery 2 to a pulsating current, and it is essential to amplify the voltage of such pulsating current. In the following specification I shall describe means to these ends.

In the circuit between the battery 2 and photo-electric apparatus 11, 12, I include a vibrator 18 and a rectifier-voltage-increasing tube 19. These devices are severally known in the electrical field, and a consideration of the wiring diagram in Fig. I will afford a full understanding to those skilled in the art. Specifically, the vibrator 18 includes an actuating coil 18b, one of whose terminals is connected, by wire 20 including a radio frequency impedance (a filter choke-coil 21), to the positive terminal of battery 2. The other terminal of the actuating coil 18b is connected, by a wire 22, including a protective resistor 23, to the wire 16 leading to the negative pole of the battery. The vibrator 18 includes an armature or reed 18c adapted to oscillate between two contacts 18a and 18d. Contact 18d is by a wire 24 connected to the usual input plate 19a of the rectifier tube 19, and a wire 26, including a by-pass condenser 27 (a radio frequency filter) in series, is connected across wires 24 and 16. The input cathode 19f of the rectifier tube is connected to input plate 19a by means of lines 40, 26, and 24. The contact 18a of the vibrator is electrically connected to the terminal of actuating coil 18b from which wire 22 extends, while the armature 18c is by a jumper wire 28 connected to the other terminal of such coil, and a wire 29, including in series a by-pass condenser or radio frequency filter 30, establishes electric communication between the last-mentioned terminal of coil 18b and the wire 16.

In known way the armature 18c vibrates continuously when the switch 5 is closed and headlight filaments 3 are energized. The vibrating armature alternately engages the contacts 18a and 18d, and causes a pulsating current to flow (through wire 24) to the input plate 19a and (through lines 24, 26, 40) to the input cathode 19f of tube 19. In this case the armature vibrates at the rate of approximately 120 cycles per second. Thus, a pulsating current is provided for the operation of the photo-electric cell 11 and amplifier tube 12.

The rectifier tube 19 is so arranged in the circuit as to increase the effective voltage of such current. More specifically, the usual filaments 19b and 19c of the rectifier tube 19 and the filament 12b of amplifier tube 12 are connected in parallel across the terminals of battery 2; that is, an electric line 25 runs from the wire 20, as shown, to the positive terminals of the filaments, while the negative terminals of the filaments are connected to wire 16, it being noted that the negative terminal of filament 12b is connected to wire 16, by means of a lead 15a and wire 15. The anode 11a of the photo-electric cell 11 is, by lines 31 and 32, connected to the usual output cathode 19d, lying between input plate 19a and filament 19b of the rectifier tube 19, and the cathode 11b of the photo-electric cell is by a lead 33 connected to the usual first-stage control grid 12a of the amplifier tube 12. The usual output plate 19e of the rectifier tube 19 is by a conductor 34 connected to a wire 35 that runs from the triode plate or anode 12c of amplifier tube 12 to a line 35a, and the line 35a is connected to the output cathode 19d of tube 19, by means of conductor 32. As already mentioned, the input cathode 19f of tube 19 is connected to the source 18 of the pulsating current, by means of lines 40, 26, and 24. The line 34 includes two resistors or impedances r1 and r2; wire 35 includes two resistors or impedances r3 and r4, and it will be noted that the connection of line 34 to wire 35 is made between the resistors r3 and r4. The resistors r1, r2, and r4 form what is known in the art as a bias-network, which is effective to establish the proper voltages across the various elements of the amplifier tube 12, while the resistor r3 comprises a voltage-limiting resistor. The usual cathode 12d of the amplifier tube is by a lead 36 connected, in common with the suppressor grid 12f of the tube, to the conductor 34, the connection being made between the resistors r1 and r2. A limiting resistor or impedance R for the first-stage control grid 12a of tube 12 is shunted from lead 33 to line 34, at a point between resistor r1 and the output plate 19e of the rectifier tube 19; the second-stage control grid 12e of tube 12 is connected to wire 35, at a point between the limiting resistor r3 and the triode plate or anode 12c, that is to say, the second-stage control grid 12e is connected in parallel with the triode plate 12c; the screen grid 12h is by a lead 37 and lines 35a and 32 connected to the output cathode 19d of the rectifier tube 19; and the usual pentode plate or anode 12m of the amplifier tube 12 is by a lead 38 connected, through the actuating coil 10b of relay 10 and lines 35a and 32, to said output cathode 19d of the rectifier tube 19. The actuating coil 10b provides an impedance (or resistance) in circuit 38, 35a between the anode of the photo-electric cell 31 and the output anode 12m of the amplifier tube 12. A pair of filter condensers c, c is connected in series across lines 34 and 35a, as shown, and from between these condensers a lead 39 extends into electrical union with the wire 16, leading to the negative pole of the battery 2. The condensers c, c and 27 provide a filter network between the vibrator 18 with its amplifier 19 and the photo-electric cell 11 with its amplifier 12. In the manner described the vibrator 18 and voltage rectifier 19 are electrically organized with the photo-electric apparatus, and as those skilled in the art will readily perceive a pulsating current of augmented potential is supplied to the plate and grid elements of the amplifier tube 12 and to the anode and cathode of the photo-electric cell 11, with the consequence and effect that, when the cell 11 is illuminated by the headlight beam of an automobile, a relay-operating current flows through the actuating coil 10b of relay 10, and continues to flow so long as such light beam plays upon the cell. Accordingly, the relay armature 10c closes, the relay 9 is energized, and the lamps 1, 1 are dimmed or deflected in the manner described.

In modification of the apparatus described above, I illustrate in Fig. II that a step-up transformer 19' of known sort may be employed in place of the rectifier tube 19, to obtain the essential amplification of voltage, and with such transformer I employ a synchronous-rectifier vibrator 18' instead of the simple vibrator 18 shown in Fig. I. The synchronous vibrator 18' is a known piece of apparatus, including two pairs of contacts a, b and c, d, and a single contact e; the contacts a and b are severally connected, by leads 50 and 51, respectively, to the opposite end terminals of the secondary coil 190 of the transformer, and the contacts c and d are in like manner connected, by leads 52 and 53, to the end terminals of the primary coil 191 of the transformer. A line 210, including a resistor or impedance r6, connects the one terminal of the vibrator actuating coil f with a line 20', leading through a choke-coil or radio frequency impedance or filter 21' to the positive terminal of the battery, and the contact e of the vibrator is connected to such line 210, at a point between the resistor r6 and the said terminal of the coil f. The opposite terminal of coil f is by a line 54 connected to a wire 16', leading to the negative pole of the battery, and the armature or reed h of the vibrator is connected to said wire 16' by means of a lead 57. A wire 55, including a by-pass condenser 56 in series, runs from the point of union of contact e with conductor 210 to the positive line 20', and a jumper 58, including in series a by-pass filter or radio frequency impedance 59, is shunted from the negative line 16' to said positive line 20'. Two condensers 60 and 61 forming a radio frequency filter are severally connected to the opposite terminals of the secondary coil 190 of the transformer, and such condensers are severally included in lines 62 and 63 leading through a wire 160 to the negative pole of battery 2'. The center-tap 192 of the primary coil of the transformer is connected to the positive pole of the battery, by means of line 20'. And the center-tap 193 of the secondary coil of the transformer is by a wire 64 connected to the input line 35a of the photo-electric cell 11 and amplifier tube 12, already described. Included in series in the line 64, 35a are a filter choke-coil 65 and a radio frequency choke-coil 66; a filter condenser 67 is connected across the input terminal of choke-coil 65 and the negative lead 160; a filter condenser 68 in like manner is connected from negative lead 160 and to line 64, 35a, at a point between the series connected output terminal of choke-coil 65 and input terminal of choke-coil 66; and a by-pass condenser 69 is connected across the output terminal of choke-coil 66 and said negative lead 160. And on the output side of the series connected choke-coils 65, 66 a jumper 70 connects the line 35a to the negative lead 160, through a voltage-limiting resistor R1'. This system of choke-coils and condensers forms a filter network between the output side of the transformer and the photo-electric cell and its amplifying tube 12.

In known manner the armature h of the synchronous vibrator 18' oscillates so long as switch 5' is closed, and, in cooperation with the transformer 19' and battery 2', the vibrator supplies a pulsating current to the current input line 35a of the photo-electric equipment 11, 12. The transformer serves to amplify the voltage of the pulsating current to a value of several times the normal voltage of the battery 2', and, indeed, to a higher value than the rectifier tube 19 of Fig. I amplifies the voltage of battery 2.

The electric hook-up of the photo-electric equipment 11, 12, relays 9 and 10, and lamp filaments 3, 4 is substantially identical with that described in Fig. I, and a further consideration will not be required by persons skilled in the art, although the following qualifications may be mentioned: (First) between the anode 11a of the photo-electric cell and the positive feed line 35a, a voltage limiting resistor or impedance R2 is included; (second) in lead 37 from the screen grid 12h of the amplifier tube to said line 35a, a voltage-limiting resistor impedance r5 is included; (third) the negative lead 15a of the filament 12b of the amplifier tube 12, together with the line 34 leading from the elements 12c, 12d, 12e and 12f of the amplifier tube, is connected, by wires 15 and 160, to the negative pole of the battery; and (fourth) the positive terminal of the filament 12b is connected to the positive pole of the battery, by means of conductor 25, and in this case the lead 17 of the contact 10a of normal open relay 10 is connected to such positive conductor 25. Thus, it will be perceived that the synchronous-rectifier vibrator 18' and the step-up transformer 19' are organized with the photo-electric apparatus 11, 12, to effect in the manner already described the automatic dimming or deflecting of the light beams generated by the automobile headlight lamps 1, 1.

In order to eliminate any tendency for the amplifier tube 12 to operate sluggishly or "lock" under the relatively high potential provided by the apparatus shown in Fig. II, a by-condenser 71 is connected between wire 34 and ground, and in like manner by-pass condensers 72 and 73 are severally connected between wires 35 and 37 and ground.

While I have said that the filaments 3 of the lamps 1, 1 generate light of greater intensity than filaments 4, it is to be understood that the filaments may be of such structure as to generate light of equal intensity. In such case the effect sought by my invention is obtained solely by deflecting the light beams. More particularly, each of lamps 1, 1 may be so positioned in a headlight that its filament 3 lies substantially at the focus of the headlight reflector, with filament 4 lying above such focus. Accordingly the light beam generated when filament 3 is energized will be projected a relatively great distance in front of the car, while the beam projected when filament 4 is energized will be deflected downward. Of course, the filaments 3 and 4 may be embodied in individual lamps, so that each headlight will include two lamps, one lamp including a filament 3 and the other a filament 4.

In the two embodiments of the invention described, it will be understood that I convert D. C. current to pulsating current, and provide double amplification. In the apparatus of Fig. I the tube 19 provides primary amplification and tube 12 secondary amplification. In the apparatus of Fig. II the transformer 19' provides primary amplification and tube 12 the secondary amplification. And as shown the vibrator or converter 18 or 18' is in each case arranged electrically between the source 2 or 2' and the primary amplifier, while the photo-electric cell 11 is arranged electrically between the primary and secondary amplifiers.

I have described the amplifying means used in conjunction with the photo-electric cell 11— the secondary amplifier—as a single triode-pentode tube 12, but it is to be understood that two triode tubes, or two pentode tubes, or a triode tube and a pentode tube may be used in place of the single tube 12. I also contemplate that the two relays 9 and 10 may be embodied in a single unit capable of the double operation described. These modifications and others will present themselves to the engineer, without departing from the essence of the invention defined in the appended claims.

Notice is hereby given of an application for Letters Patent, Serial No. 132,966, filed by me on the 25th day of March, 1937, covering an improved photo-electric cell for use in the practice of the above-described invention.

I claim as my invention:

1. In apparatus including in conventional assembly a source of D. C. energy, an electric lamp, a circuit connecting said lamp with said source, a circuit-controlling device for said circuit, and light-sensitive means for operating said device; the herein described improvements in which said means include a photo-electric circuit connected to said source, primary and secondary electric amplifiers included in said photo-electric circuit, a current converter arranged electrically between said source and said primary amplifier, and a photo-electric cell arranged electrically between said primary and secondary amplifiers.

2. In apparatus including in conventional assembly a source of D. C. energy, an electric lamp, a circuit connecting said lamp with said source, a circuit-controlling device for said circuit, and light-sensitive means for operating said device; the herein described improvements in which said means include a photo-electric circuit connected to said source and including a photo-electric cell and an amplifying tube, a current converter arranged electrically between said source and said cell, and a filter-network arranged electrically between said converter and said cell.

3. In apparatus including in conventional assembly a source of D. C. energy, an electric lamp, a circuit connecting said lamp with said source, a circuit-controlling device for said circuit, and light-sensitive means for operating said device; the herein described improvements in which said means include a photo-electric circuit connected to said source, primary and secondary electric amplifiers included in said photo-electric circuit, a current converter arranged electrically between said source and said primary amplifier, and a photo-electric cell arranged electrically between said primary and secondary amplifiers, and a filter network organized with said converter and primary amplifier and arranged electrically between such last-mentioned elements and said cell and secondary amplifier.

4. In photo-electric apparatus for operating a circuit-controlling device, said apparatus including a source of D. C. current, a photo-electric circuit connected to such source, and a photo-electric cell and an amplifying tube included in such circuit, the herein described refinement in such apparatus which includes a current converter arranged electrically between said source and said cell, and a filter network arranged electrically between such converter and said tube.

5. In photo-electric apparatus for operating a circuit-controlling device, said apparatus including a source of D. C. current, a photo-electric circuit connected to such source, and primary and secondary electric amplifiers included in said photo-electric circuit, the herein described refinement that comprises a current converter arranged electrically between said source and said primary amplifier, and a photo-electric cell arranged electrically between said primary and secondary amplifiers.

6. In apparatus including in conventional assembly a source of D. C. energy, an electric lamp, a circuit connecting said lamp with said source, a circuit-controlling device for said circuit, and light-sensitive means for operating said device; the herein described improvements in said means that comprise a photo-electric circuit connected to said source; a current converter, primary and secondary amplifiers, and a photo-electric cell included in said photo-electric circuit; said cell including an anode and a cathode, said secondary amplifier comprising a tube including a control grid and an output anode, and an impedance arranged electrically between the anode of said cell and the output anode of said tube.

7. In apparatus including in conventional assembly a source of D. C. energy, an electric lamp, a circuit connecting said lamp with said source, a circuit-controlling device for said circuit, and light-sensitive means for operating said device; the herein described improvements in said means that comprise a photo-electric circuit connected to said source; a current converter, primary and secondary amplifiers, and a photo-electric cell included in said photo-electric circuit; said cell including an anode and a cathode, said secondary amplifier comprising a tube including a control grid and an output anode, and an impedance arranged electrically between the anode of said cell and the output anode of said tube, and a filter network in said circuit between said amplifying tube and said converter.

8. In apparatus including in conventional assembly a source of D. C. energy, an electric lamp, a circuit connecting said lamp with said source, a circuit-controlling device for said circuit, and light-sensitive means for operating said device, the herein described improvements in said means that comprise a relay and a photo-electric circuit for energizing said relay, said photo-electric circuit including a current converter, a photo-electric cell and primary and secondary amplifiers, the actuating coil of said relay comprising an impedance between said cell and the output side of said secondary amplifier.

9. In apparatus including in conventional assembly a source of D. C. energy, an electric lamp, a circuit connecting said lamp with said source, a circuit-controlling device for said circuit, and light-sensitive means for operating said device, the herein described improvements in said means that comprise a relay and a photo-electric circuit for energizing said relay, said photo-electric circuit including a current converter, a photo-electric cell and primary and secondary amplifiers, the actuating coil of said relay comprising an impedance between said cell and the output side of said secondary amplifier, and a filter network connected electrically between said converter and said secondary amplifier.

10. In photo-electric apparatus for operating a circuit-controlling device, said apparatus including in conventional assembly a relay for operating said device and a photo-electric circuit for operating said relay; the herein described improvements in said photo-electric circuit that comprise a source of D. C. current, a current converter, a photo-electric cell including an anode and cathode, an amplifying tube including input and output elements, with the actuating coil of said relay connected between the anode element of said cell and the output element of said tube to provide an impedance between such elements.

11. In photo-electric apparatus for operating a circuit-controlling device, said apparatus including in conventional assembly a relay for operating said device and a photo-electric circuit for operating said relay; the herein described improvements in said photo-electric circuit that comprise a source of D. C. current, primary and secondary amplifiers, a converter between said source and said primary amplifier, a photo-electric cell between said amplifiers, said cell including an anode and a cathode, said secondary amplifier comprising a tube including input and output elements, and an impedance connected between the anode of said cell and the output element of said tube.

12. The structure of the next-preceding claim, in which the actuating coil of said relay comprises said impedance.

HENRY A. BERG, Jr.